(12) United States Patent
Krithivasan et al.

(10) Patent No.: US 7,809,783 B2
(45) Date of Patent: Oct. 5, 2010

(54) BOOTH MULTIPLIER WITH ENHANCED REDUCTION TREE CIRCUITRY

(75) Inventors: Shankar Krithivasan, Austin, TX (US); Christopher Edward Koob, Round Rock, TX (US)

(73) Assignee: QUALCOMM Incorporated, San Diego, CA (US)

( * ) Notice: Subject to any disclaimer, the term of this patent is extended or adjusted under 35 U.S.C. 154(b) by 933 days.

(21) Appl. No.: 11/355,397

(22) Filed: Feb. 15, 2006

(65) Prior Publication Data

US 2007/0192398 A1    Aug. 16, 2007

(51) Int. Cl.
G06F 7/52    (2006.01)

(52) U.S. Cl. ...................................... 708/628
(58) Field of Classification Search .................. 708/628
See application file for complete search history.

(56) References Cited

U.S. PATENT DOCUMENTS

| | | | |
|---|---|---|---|
| 4,748,582 A | | 5/1988 | New et al. |
| 4,813,008 A | | 3/1989 | Shigehara |
| 4,901,307 A | | 2/1990 | Gilhousen et al. |
| 4,910,701 A | | 3/1990 | Gibbons et al. |
| 5,103,459 A | | 4/1992 | Gilhousen et al. |
| 5,150,322 A | * | 9/1992 | Smith et al. ................. 708/628 |
| 5,220,525 A | | 6/1993 | Anderson et al. |
| 5,506,799 A | | 4/1996 | Nakao |
| 5,880,985 A | | 3/1999 | Makineni et al. |
| 5,928,316 A | | 7/1999 | Wong et al. |
| 6,157,939 A | | 12/2000 | Vo |
| 6,167,422 A | * | 12/2000 | Purcell et al. ................. 708/628 |
| 6,183,122 B1 | * | 2/2001 | De Angel ...................... 708/628 |
| 6,463,453 B1 | | 10/2002 | Dang |
| 2007/0192399 A1 | | 8/2007 | Krithivasan et al. |

FOREIGN PATENT DOCUMENTS

EP    0497622    8/1992

(Continued)

OTHER PUBLICATIONS

International Search Report—PCT/US2007/062082, International Search Authority—European Patent Office, Aug. 21, 2007.

*Primary Examiner*—Tan V Mai
(74) *Attorney, Agent, or Firm*—Peter M. Kamarchik; Nicholas J. Pauley; Sam Talpalatsky

(57) ABSTRACT

Techniques for the design and use of a digital signal processor, including processing transmissions in a communications (e.g., CDMA) system. A modified Booth multiplication system and process determine a multiplicand, A, and a multiplier, B. Radix-m, (e.g., radix-4) Booth recoding on B generates "n" multiplication factors, where "n," an integer, is approximating one half of the number of the multiplier bits. "n" partial products are generated using the "n" multiplication factors as multipliers of A. Then, a multiplication tree is formed using radix-m Booth encoding. The multiplication tree includes multiplier bits associated to generate a multiplication factors. In the event of a negative multiplication factor, a two's complement of A is formed by inverting the bits of A and associating a sticky "1" to complete the two's complementation. Furthermore, multiplication factors are reduced in multiple stages to a form sum and carry components of a pre-determined length. The additive inverse of A×B is formed by using novel techniques to calculate the product of A and −B.

24 Claims, 8 Drawing Sheets

FOREIGN PATENT DOCUMENTS

| | | |
|---|---|---|
| EP | 0840207 | 5/1998 |
| EP | 0992885 | 4/2000 |
| JP | 01-116764 | 5/1989 |
| JP | 04-246723 | 9/1992 |
| JP | 05-027948 | 2/1993 |
| JP | 08-348455 | 12/1994 |
| JP | 10-011267 | 1/1996 |
| JP | 10-133856 | 5/1998 |
| JP | 10-143355 | 5/1998 |
| JP | 10-333885 | 12/1998 |
| JP | 11-134175 | 5/1999 |
| JP | 2002-157114 | 5/2002 |
| WO | 0127742 | 4/2001 |

\* cited by examiner

| B[2n+1:2n-1] | MULTIPLE OF A |
|---|---|
| 000, 111 | 0 |
| 001, 010 | 1 |
| 011 | 2 |
| 100 | -2 |
| 101, 110 | -1 |

| MULT FACTOR | UNSIGNED(n8=0) | UNSIGNED(n8=1) | SIGNED(n8=0) | SIGNED(n8=1) |
|---|---|---|---|---|
| +2 | {1,0,0,a} | {1,0,0,~a} | {~a,a,a,a} | {1,0,0,~a} |
| +1/+0 | {1,0,0,0} | {1,0,0,1} | {~a,a,a,a} | {1,0,0,~a} |
| -1/-0 | {0,1,1,1} | {1,0,0,0} | {~a,a,a,a} | {1,0,0,~a} |
| -2 | {0,1,1,~a} | {~a,a,a,a} | {~a,a,a,a} | {1,0,0,~a} |

BOOTH MULTIPLIER WITH ENHANCED REDUCTION TREE CIRCUITRY

RELATED APPLICATIONS

This application is related to U.S. patent application Ser. No. 11/356,359, filed Feb. 15, 2006 and entitled "POWER-EFFICIENT SIGN EXTENSION FOR BOOTH MULTIPLICATION METHODS AND SYSTEMS."

FIELD

The present invention relates to the field of math processors in digital signal processors, and more particularly, to Booth multipliers used in math processors to perform high speed multiplication of numbers. More specifically, the present invention relates to a multiplier circuit capable of performing operations on operands of various data types and also for signed and un-signed binary values.

DESCRIPTION OF THE RELATED ART

Increasingly, electronic equipment and supporting software applications involve digital signal processing. Home theatre, computer graphics, medical imaging and telecommunications all rely on digital signal processing technology. Digital signal processing requires fast math in complex, but repetitive algorithms. Many applications require computations in real-time, i.e., the signal is a continuous function of time, which must be sampled and converted to digital, for numerical processing. The processor must execute algorithms performing discrete computations on the samples as they arrive. The architecture of a digital signal processor, or DSP, is optimized to handle such algorithms. The characteristics of a good signal processing engine include fast, flexible arithmetic computation units, unconstrained data flow to and from the computation units, extended precision and dynamic range in the computation units, dual address generators, efficient program sequencing, and ease of programming.

One promising application of DSP technology includes communications systems such as a code division multiple access (CDMA) system that supports voice and data communication between users over a satellite or terrestrial link. The use of CDMA processes in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEHANDSET SYSTEM," both assigned to the assignee of the claimed subject matter.

A CDMA system is typically designed to conform to one or more telecommunications, and now streaming video, standards. One such first generation standard is the "TIA/EIA/IS-95 Terminal-Base Station Compatibility Standard for Dual-mode Wideband Spread Spectrum Cellular System," hereinafter referred to as the IS-95 standard. The IS-95 CDMA systems are able to transmit voice data and packet data. A newer generation standard that can more efficiently transmit packet data is offered by a consortium named "3$^{rd}$ Generation Partnership Project" (3GPP) and embodied in a set of documents including Document Nos. 3G TS 25.211, 3G TS 25.212, 3G TS 25.213, and 3G TS 25.214, which are readily available to the public. The 3GPP standard is hereinafter referred to as the W-CDMA standard. There are also video compression standards, such as MPEG-1, MPEG-2, MPEG-4, H.263, and WMV (Windows Media Video), as well as many others that such wireless handsets will increasingly employ.

In order to accomplish fast and flexible arithmetic computation units, there is the need to perform high-speed multiplication operations. One process for performing such operations is known as Booth multiplication. Booth multiplication is a process that allows for smaller, faster multiplication circuits, by recoding the numbers that are multiplied. Multiplication, using the Booth process, is typically performed by the generation of partial products. The partial products are then added to obtain the final result. With the Booth multiplication process, the number of partial products equals the number of rows in a multiplier matrix. The term "partial product" refers to a row in the multiplication tree.

There exist numerous modifications to the original Booth's algorithm, but the fundamental principle is to generate fewer partial products using the Booth encoding process. It is possible to reduce the number of partial products by approximately half, by using the process of radix-4 Booth recoding. Radix-4 Booth recoding maps the bits of multiplier B, which are originally represented in binary values of 0 and 1 into a set of multiplication factors which can take the values of −2, −1, 0, 1 or 2. This method provides the benefit of approximately halving the number of partial products that would otherwise occur. This is important in circuit design as it relates to the propagation delay in the running of the circuit, and the complexity and power consumption of its implementation.

Once the partial products have been generated using the process of Booth encoding, they are added together by employing reduction techniques. The process of reduction involves summing the multiple rows of partial product bits in a parallel process using half-adders, full-adders and multi-operand adders. This reduction results in two rows of bits said to be in the redundant format, whose sum, when resolved using a carry propagate adder represents the final product. One of these rows is called the Sum S and the other row is called Carry C. In multiply-accumulate (MAC) operations, the Z term in [Z+(A×B)] is typically included in the reduction tree prior to the final CPA. This process saves on employing CPAs both for the resolution of the multiplication product in the redundant format and for the subsequent accumulation.

Since some partial products may be negative, the hardware required for two's complementation is an aspect of the Booth multiplier. With such hardware, there is a need to provide a Booth multiplier capable of generating the additive inverse of the multiplication product. Presently, no known method or system exists which is capable of generating −(A×B) efficiently for DSP applications. Accordingly, a need exists for a method and system capable of using the Booth multiplication process for generating the additive inverse of the product, −(A×B), in DSP applications.

Once such a product is generated, however, there is the problem that if the value to be accumulated, "Z" to the product of a multiplication "A×B," is of a higher bit-width than the product A×B, then both the "sum" and "carry" components of the redundant product need to be sign extended appropriately. Sometimes, it may be necessary to perform sign extension over a wide range of bits. There is, accordingly the need for a process of appropriate sign extension during Booth multiplication processes in a DSP.

SUMMARY

Techniques for providing a booth multiplier with enhanced reduction tree circuitry are disclosed, which processes improve both the operation of a digital signal processor and the efficient use of digital signal processor instructions for processing increasingly robust software applications for personal computers, personal digital assistants, wireless handsets, and similar electronic devices, as well as increasing the associated digital signal processor speed and service quality.

Accordingly, the disclosed subject matter provides processes for the design and use of a digital signal processor, including processing transmissions in a communications (e.g., CDMA) system. The disclosed method and system perform improved Booth multiplication in a digital signal processor. The method and system determine a multiplicand, A, that includes a first plurality of bits and a multiplier, B, having a second plurality of bits. The disclosed subject matter performs radix-m, (e.g., radix-4) Booth recoding on B to generate a first predetermined integer number, "n," of multiplication factors. The "n" multiplication factors approximate a ratio (e.g., one half, for radix-4 multiplication) of the number of the second plurality of bits. The method and system further generate "n" partial products using the "n" multiplication factors as multipliers of A. Then, a multiplication tree is formed using radix-m Booth encoding. In the event of a negative multiplication factor, the disclosure includes forming a two's complement of A by inverting the first plurality of bits of A and associating a sticky "1" to complete the two's complementation. Furthermore, the process involves reducing the multiplication factors in multiple stages of reduction to a set of sum and carry components of a pre-determined length.

These and other advantages of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features and advantages here provided will become apparent to one with skill in the art upon examination of the following FIGUREs and detailed description. It is intended that all such additional systems, methods, features and advantages be included within this description, be within the scope of the accompanying claims.

BRIEF DESCRIPTIONS OF THE DRAWINGS

The features, nature, and advantages of the disclosed subject matter will become more apparent from the detailed description set forth below when taken in conjunction with the drawings wherein like reference characters identify correspondingly throughout and wherein.

Figure 3:
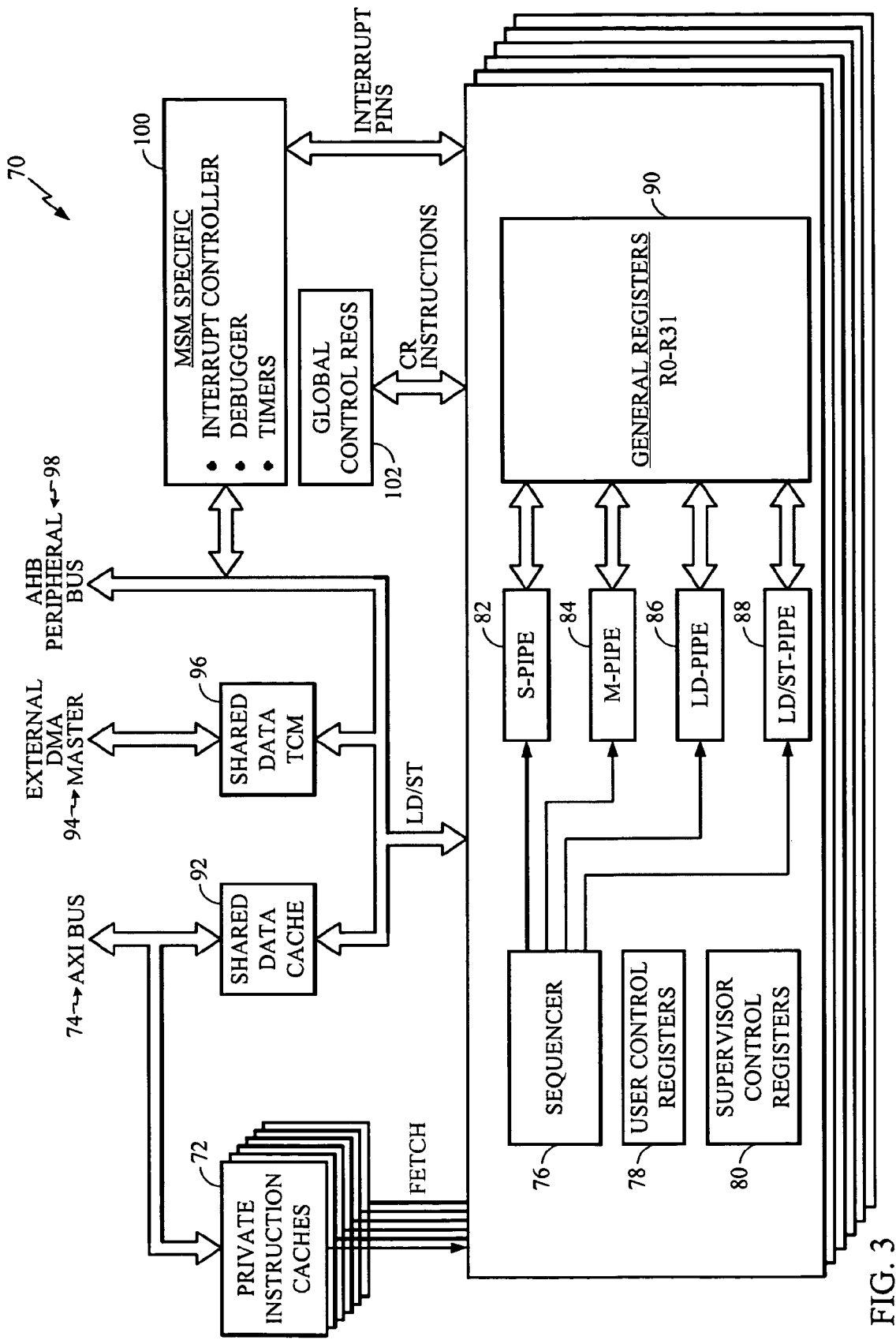
Figure 4:
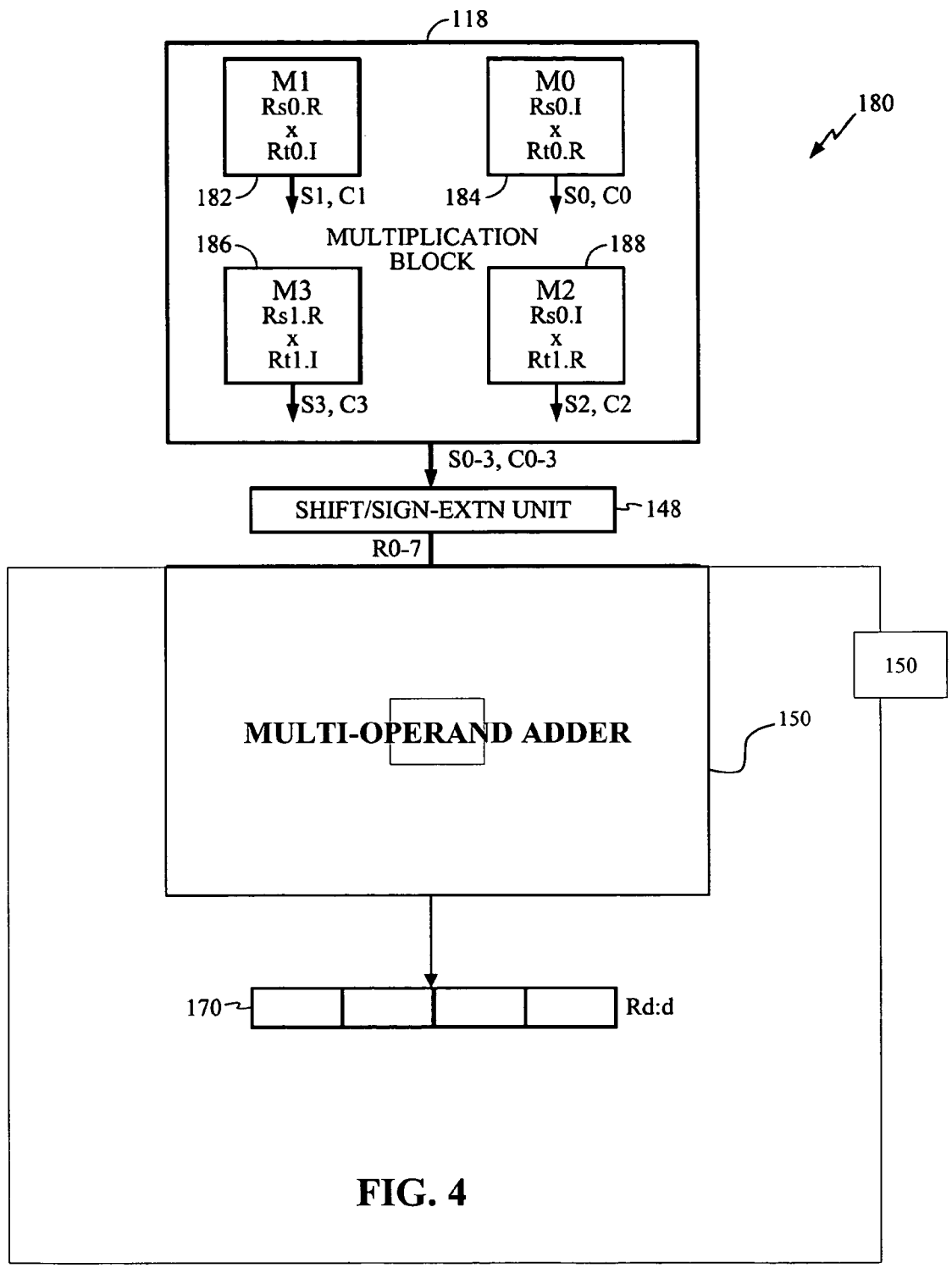
Figure 5:
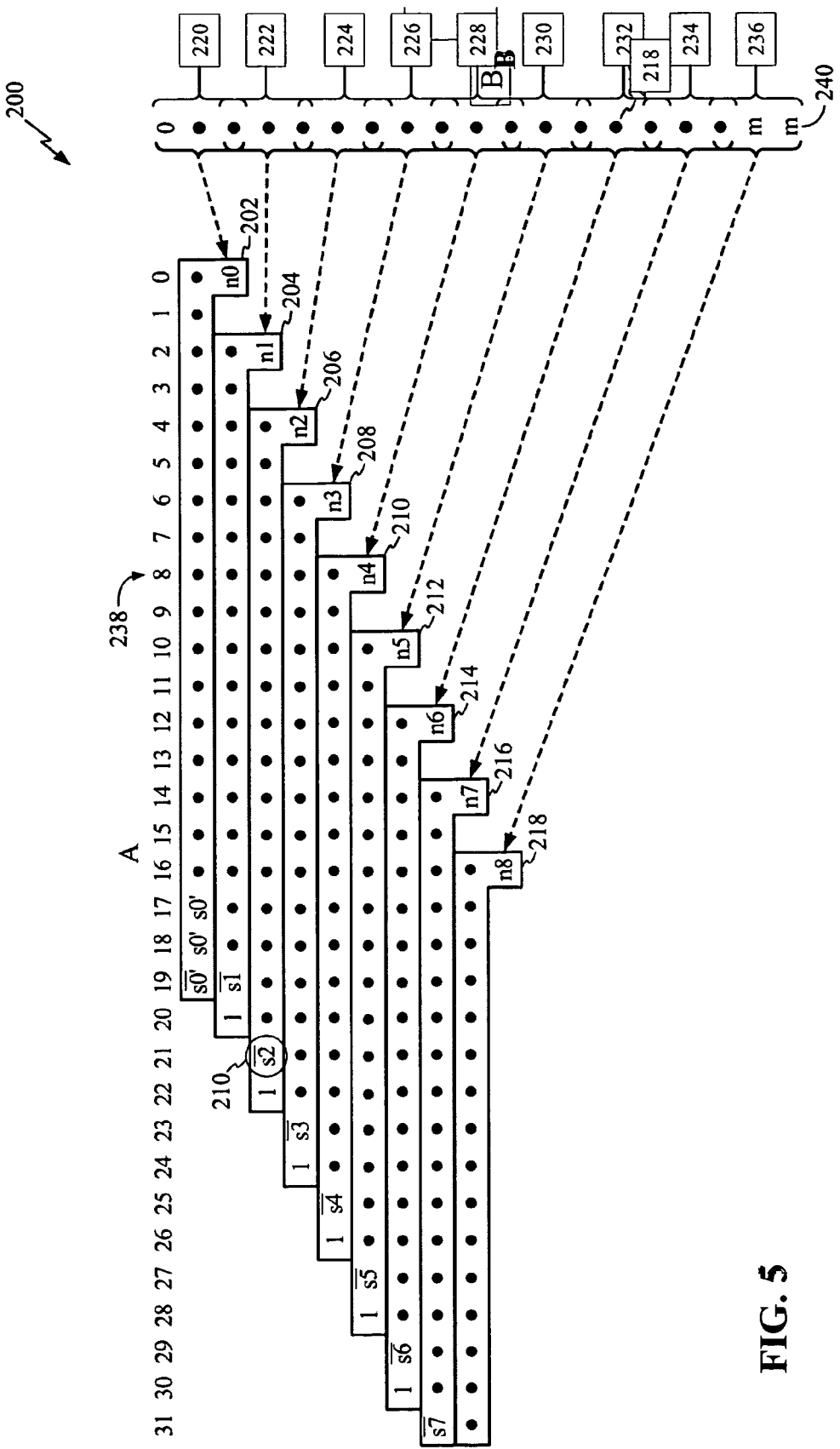
Figures 6, 7:
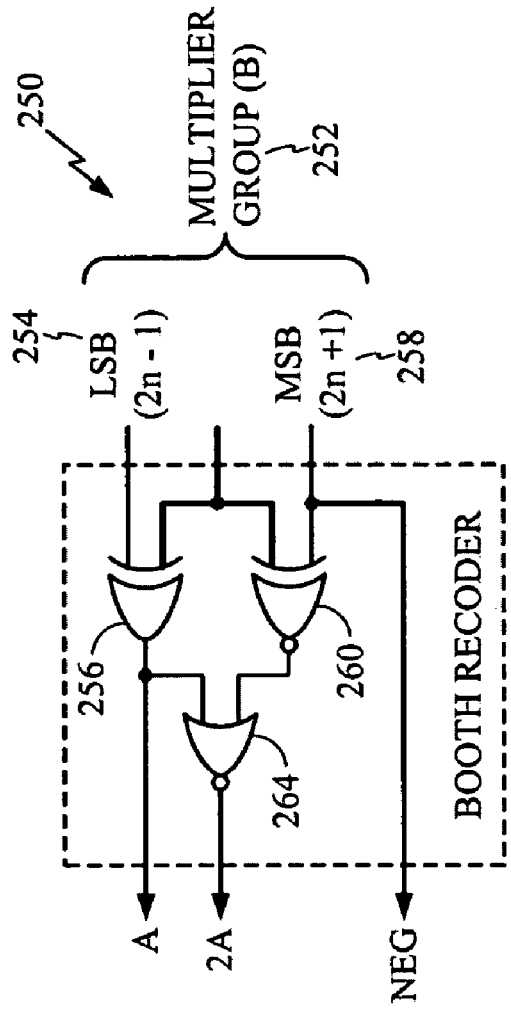
Figures 8, 9:
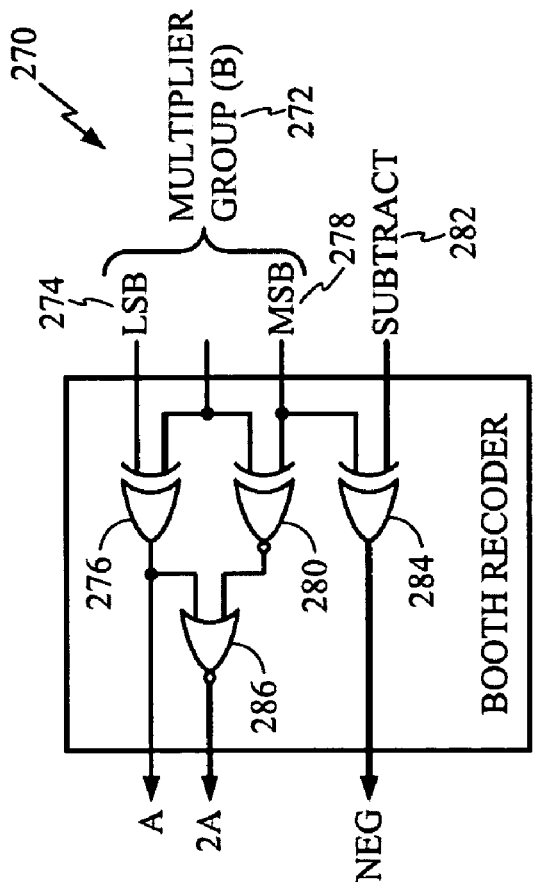
Figure 10:
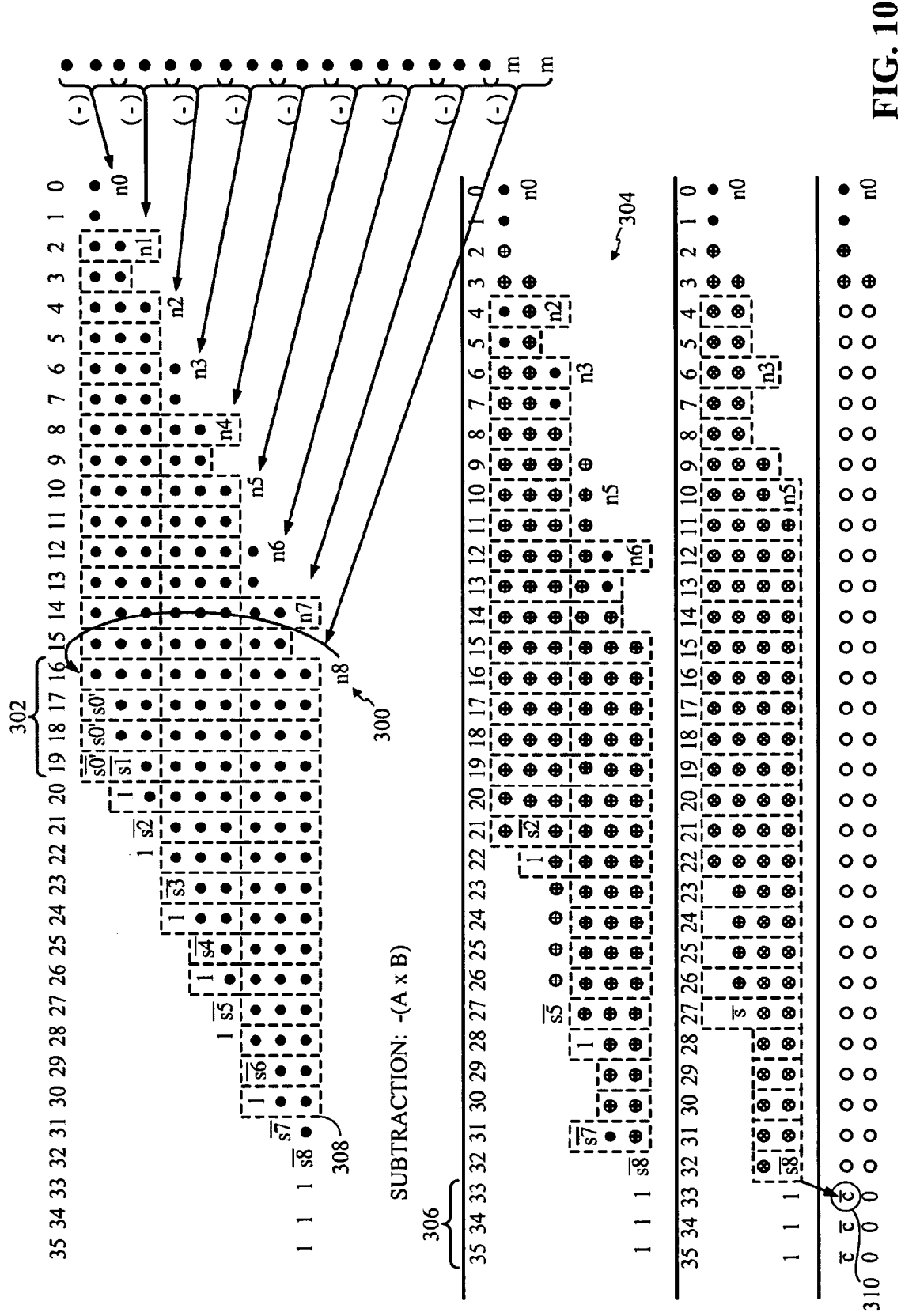

FIG. 3 provides an architecture block diagram of one embodiment of a digital signal processor providing the technical advantages of the disclosed subject matter;

FIG. 4 presents a data path diagram for various implementations of the disclosed subject matter;

FIG. 5 presents a modified 16×16 radix-4 Booth multiplication tree applicable to the disclosed subject matter;

FIG. 6 provides a logic cell for implementing the Booth recoder for the disclosed subject matter;

FIG. 7 provides a description of the bit grouping for the logic cell of FIG. 7 with the disclosed subject matter;

FIG. 8 presents a logic cell for implementing Booth recoding logic for the −(A×B) product;

FIG. 9 is a table of how the disclosed subject matter handles subtraction in Booth multiplication; and FIG. 10 shows a 16×16 Booth multiplication reduction tree according to further teachings of the disclosed subject matter.

DETAILED DESCRIPTION OF THE SPECIFIC EMBODIMENTS

The disclosed subject matter for the modified Booth multiplier here presented has use in a very wide variety of digital signal processing applications, including those involving multi-threaded processing. One such application appears in telecommunications and, in particular, in wireless handsets that employ one or more digital signal processing circuits. Consequently, the following FIGS. 1 through 3 describe a telecommunications DSP within which the present teachings may be useful. FIG. 4 sets forth a data path for multiplication processing within which the present disclosure of an enhanced Booth multiplication operation may operate. Remember, however, that the implementation here described provides but one of a virtually limitless set of applications to which the disclosed subject matter may apply.

Figure 1:
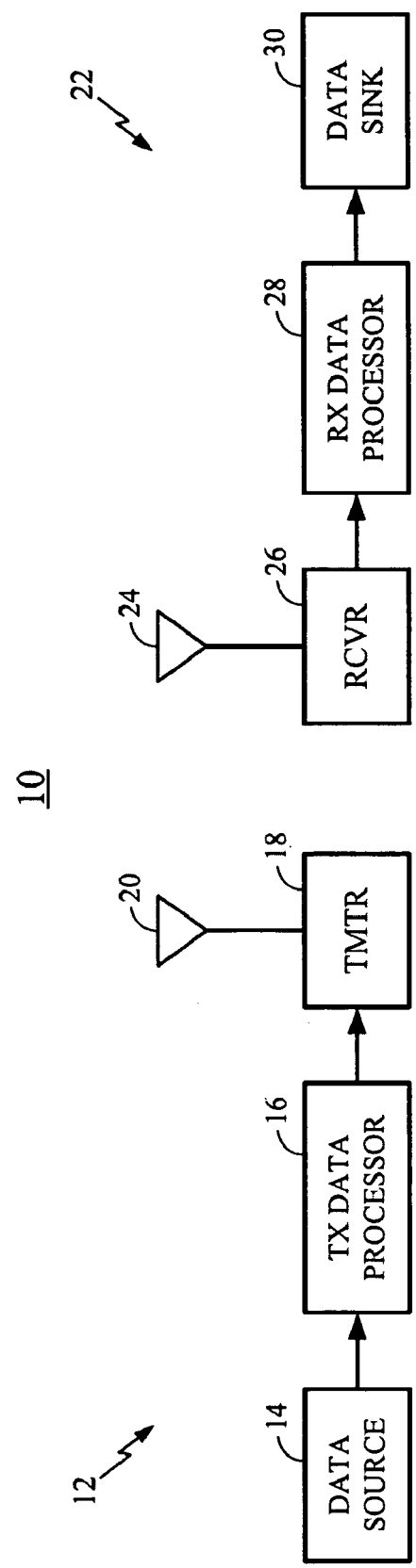
FIG. 1 is a simplified block diagram of a communications system that can implement the present embodiment.

For the purpose of explaining how such a wireless handset may be used, FIG. 1 provides a simplified block diagram of a communications system 10 that can implement the presented embodiments of the disclosed interrupt processing method and system. At a transmitter unit 12, data is sent, typically in blocks, from a data source 14 to a transmit (TX) data processor 16 that formats, codes, and processes the data to generate one or more analog signals. The analog signals are then provided to a transmitter (TMTR) 18 that modulates, filters, amplifies, and up converts the baseband signals to generate a modulated signal. The modulated signal is then transmitted via an antenna 20 to one or more receiver units.

At a receiver unit 22, the transmitted signal is received by an antenna 24 and provided to a receiver (RCVR) 26. Within receiver 26, the received signal is amplified, filtered, down converted, demodulated, and digitized to generate in phase (I) and (Q) samples. The samples are then decoded and processed by a receive (RX) data processor 28 to recover the transmitted data. The encoding and processing at receiver unit 22 are performed in a manner complementary to the coding and processing performed at transmitter unit 12. The recovered data is then provided to a data sink 30.

The signal processing described above supports transmissions of voice, video, packet data, messaging, and other types of communication in one direction. A bi-directional communications system supports two-way data transmission. However, the signal processing for the other direction is not shown in FIG. 1 for simplicity. Communications system 10 can be a code division multiple access (CDMA) system, a time division multiple access (TDMA) communications system (e.g., a GSM system), a frequency division multiple access (FDMA) communications system, or other multiple access communications system that supports voice and data communication between users over a terrestrial link. In a specific embodiment, communications system 10 is a CDMA system that conforms to the W-CDMA standard.

Figure 2:
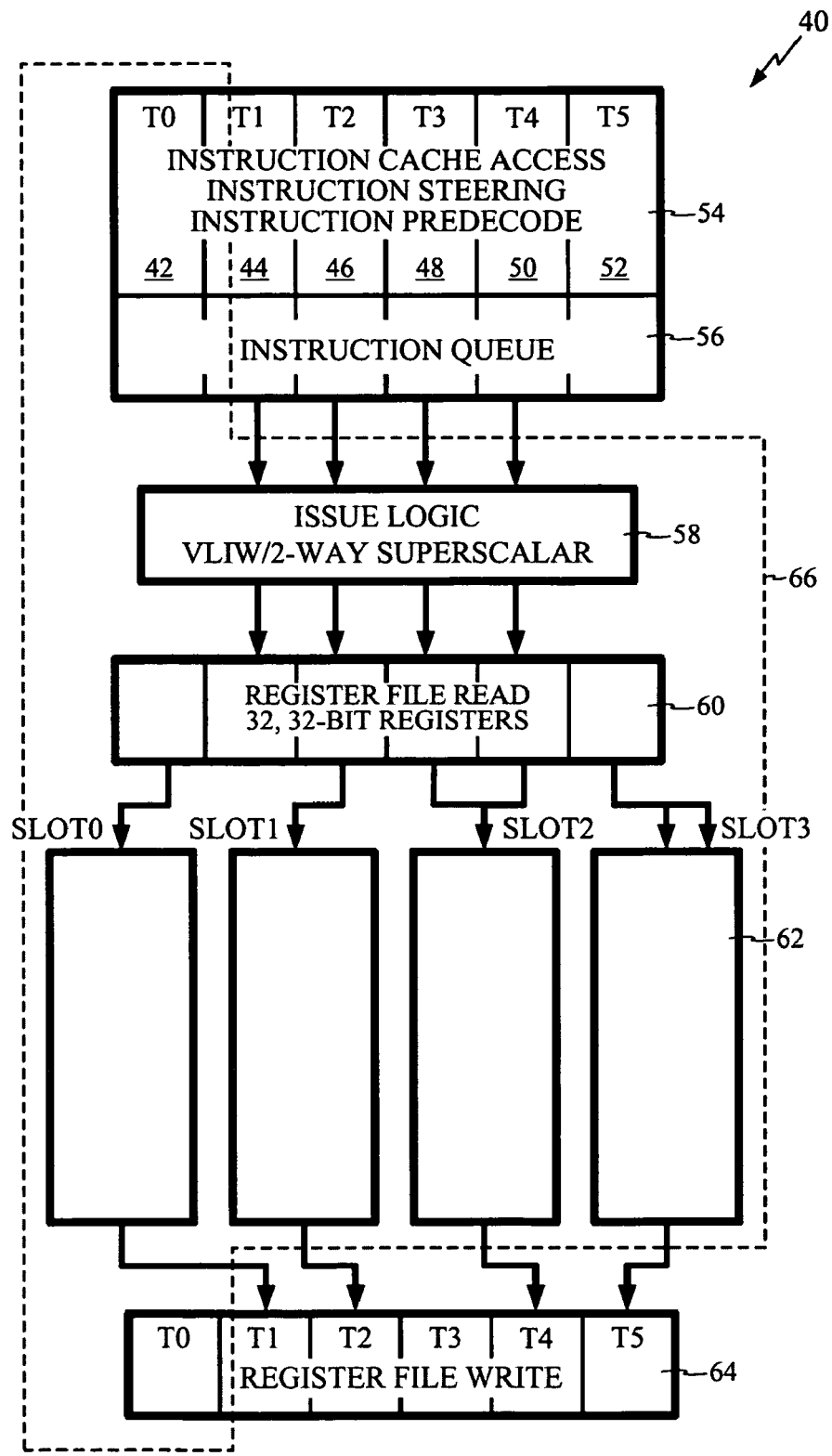
FIG. 2 illustrates a DSP architecture for carrying forth the teachings of the present embodiment.

FIG. 2 illustrates DSP 40 architecture that may serve as the transmit data processor 16 and receive data processor 28 of FIG. 1. Once more, emphasis is made that DSP 40 only represents one embodiment among a great many of possible digital signal processor embodiments that may effectively use the teachings and concepts here presented. In DSP 40, therefore, threads T0:T5 (reference numerals 42 through 52), contain sets of instructions from different threads. Circuit 54 represents the instruction access mechanism and is used for fetching instructions for threads T0:T5. Instructions for circuit 54 are queued into instruction queue 56. Instructions in instruction queue 56 are ready to be issued into processor pipeline 66 (see below). From instruction queue 56, a single thread, e.g., thread T0, may be selected by issue logic circuit 58. Register file 60 of selected thread is read and read data is sent to execution data paths 62 for SLOT0 through SLOT3. SLOT0 through SLOT3, in this example, provide for the packet grouping combination employed in the present embodiment.

Output from execution data paths 62 goes to register file write circuit 64, also configured to accommodate individual threads T0:T5, for returning the results from the operations of DSP 40. Thus, the data path from circuit 54 and before to register file write circuit 64 being portioned according to the various threads forms a processing pipeline 66.

The present embodiment may employ a hybrid of a heterogeneous element processor (HEP) system using a single microprocessor with up to six threads, T0:T5. Processor pipeline 66 has six stages, matching the minimum number of processor cycles necessary to fetch a data item from circuit 54 to registers 60 and 64. DSP 40 concurrently executes instructions of different threads T0:T5 within a processor pipeline 66. That is, DSP 40 provides six independent program counters, an internal tagging mechanism to distinguish instructions of threads T0:T5 within processor pipeline 66, and a mechanism that triggers a thread switch. Thread-switch overhead varies from zero to only a few cycles.

DSP 40, therefore, provides a general-purpose digital signal processor designed for high-performance and low-power across a wide variety of signal, image, and video processing applications. FIG. 3 provides a brief overview of the DSP 40 architecture, including some aspects of the associated instruction set architecture for one manifestation of the disclosed subject matter. Implementations of the DSP 40 architecture support interleaved multithreading (IMT). In this execution model, the hardware supports concurrent execution of multiple hardware threads T0:T5 by interleaving instructions from different threads in the pipeline. This feature allows DSP 40 to include an aggressive clock frequency while still maintaining high core and memory utilization. IMT provides high throughput without the need for expensive compensation mechanisms such as out-of-order execution, extensive forwarding networks, and so on.

FIG. 3, yet more specifically, provides an architecture block diagram of one embodiment of a programming model for a single thread that may employ the teachings of the disclosed subject matter. Block diagram 70 depicts private instruction caches 72 which receive instructions from AXI Bus 74, which instructions include mixed 16-bit and 32-bit instructions to sequencer 76, user control register 78, and supervisor control register 80 of threads T0:T5. Sequencer 76 provides hybrid two-way superscalar instructions and four-way VLIW instructions to S-pipe unit 82, M-pipe unit 84, Ld-pipe 86, and Ld/St-pipe unit 88. AXI Bus 74 also communicates with shared data cache 90 LD/ST instructions to threads T0:T5. With external DMA master 96 shared data TCM 98 communicates LD/ST instructions, which LD/ST instructions further flow to threads T0:T5. From AHB peripheral bus 100 MSM specific controller 102 communicates interrupt pins with T0:T5, including interrupt controller instructions, debugging instructions, and timing instructions. Global control registers 104 communicates control register instructions with threads T0:T5.

Within the architecture of the single-thread processing as presented in M-pipe 84 of FIG. 3, high-speed mathematical processing occurs. The timing of multiplication within multiplication block 118 is important to assure that operations of M-pipe 84 properly take place. Similar timing considerations are very likely to exist in any application to which the disclosed subject matter may be applied. Accordingly, the speed with which the Booth multiplication process occurs provides a distinctively novel aspect of the material here disclosed.

In order to satisfy these time constraints, the disclosed subject matter uses Booth multiplication capable of performing the product of two numbers, A×B, or the additive inverse of the product of two numbers, −A×B. In addition, the present disclosure includes a method for including a rounding constant in the booth reduction tree and a sign extension process, which reduces power and area. Moreover, the Booth multiplication processes of the present disclosure may require the partial products to be signed numbers, even if the multiplication is performed on unsigned operands. Since some partial products may be negative, the two's complementation circuitry for performing Booth multiplication allows modification to a conventional Booth multiplier so as to generate the negative value of the multiplication product. The ability to generate −(A×B) efficiently has a great impact on many DSP applications, including operations of the form [Z+−(A×B)]. These multiply accumulate operations, or MAC operations are enabled by the present disclosure.

FIG. 4 presents a data path diagram 180 for various implementations of the disclosed subject matter and establishes the data flow within which the present Booth multiplication process may take place. In particular, multiplication block 118 receives Rs and Rt input. Within multiplication block 118 are multiplication units M0:M3. In particular, M0 multiplier unit 182, M1 multiplier unit 184, M2 multiplier unit 186, and M3 multiplier unit 188 individually receive Rs and Rt input to generate, respectively, S0C0 (i.e., Sum0 and Carry0), S1C1, S2C2, and S3C3 output to shift/sign-extension unit 148. Shift/sign-extension unit 148 is responsible for logical shifts and sign extension of these intermediate redundant products.

Multiplier block 118, therefore, performs the multiplication related instructions for M-pipe 84. These instructions may be treated as compound instructions which use a 16×16 multiplication process as a basis. The multiplier block consists of four 16×16 multiplier units, M0:M3. Each multiplier unit M0:M3 is capable of functioning in several modes, to support the wide variety of M-type instructions. Signed and unsigned modes are supported. The multipliers can also generate the two's complement of their products, in the case when subtraction needs to be performed on the products.

With the disclosed subject matter, M0:M3 multipliers 182 through 188 use radix-4 Booth encoding. In the unsigned mode, they resemble a 17×17 multiplier with the extra 17th bit acting as the sign bit. Except for double precision multiplication (i.e., 32×32 multiplication), all the other multiply instructions are "signed×signed" or "unsigned×unsigned". Computing double precision 32×32 multiplications and 32×16 multiplies using 16×16 multipliers requires "signed× unsigned" and "unsigned×signed" multiplications as well. All of these modes are supported by controlling the sign bits of the multiplicand and the multiplier operands of M0:M3 multipliers 182 through 188.

Output from shift/sign-extension unit 148 goes to multi-operand adder 150 and may be parsed into R0:R3 input. Multi-operand adder 150 receives these R0:R3 inputs and ultimately, after a set of compression and accumulation stages, provides Rdd outputs 170.

Data path 180 may be understood as divisible into four phases. First of all, in the data routing phase data from the Rs and Rt source registers are fed to multiplication block 118. Within multiplication block 118, 16-bit half-words from the source operands are routed to four M0:M3 multiplier units 182 through 188 based on the instruction. Next, partial product generation and reduction vector addition or subtraction occurs wherein M0:M3 multiplier units 182 through 188 generate partial products using radix-4 Booth encoding and reduce them using reduction to a redundant pair of outputs.

During the multi-operand reduction phase, the redundant outputs from multiplication block 118 are input to the multi-operand adder which reduces these inputs and an optional accumulator/round value into two pairs of redundant outputs. Finally, in the addition/saturation phase, redundant outputs are resolved using carry propagate addition, and saturation is performed when applicable.

The disclosed subject matter, therefore, provides for the modified Booth multiplication of such values. With such complex values, the inputs have a real 16-bit value in the low halfword and an imaginary 16-bit value in the high halfword. The multiplier results are optionally scaled by 0-1 bits. A rounding constant is added to each real and imaginary sum. The real and imaginary parts are individually saturated to 32 bits. The upper 16-bits of each of the 32-bit results are packed in a 32-bit destination register.

In this example, S0:S3 and C0:C3 are 33-bits wide. Even though the output of a 16×16 multiplication can be represented in 32-bits, some instructions operate in an unsigned mode and the extra bit is used in this case as the sign bit to facilitate sign extension. S0:S3 and C0:C3 are passed through shift/sign-extension unit 148. S0:S1 and C0:C1 contribute to the lower order 32-bits of the final result, before packing. This forms the real part of the result. These four numbers are optionally scaled by a left shift of 1-bit if specified in the instruction.

The shifted version of these numbers are labeled R0:R3. R0:R3 are passed through multi-operand adder 150. Output from multi-operand adder 150 flows to saturation/addition unit 170.

FIG. 5 facilitates understanding the Booth multiplication processes of the disclosed subject matter by presenting a modified 16×16 radix-4 Booth multiplication tree applicable to the disclosed subject matter. Dot diagram 200 of FIG. 5 conceptual depicts the radix-4 Booth encoding on 16×16 multipliers of the disclosed subject matter, which results in nine partial products 202, 204, 206, 208, 210, 212, 214, 216, and 218. The nine partial products are reduced to two 33-bit redundant outputs, S0:S3 and C0:C3 using a reduction tree consisting of two levels of 3:2 reduction followed by one level of 4:2 compression. Though 32-bits of precision is sufficient for a 16×16 multiplication, the 33rd bit is also preserved to act as a sign bit in the case of unsigned multiplication. An additional carry-out bit from the 33rd column is also output from the multiplier to aid in sign extension.

Referring further to FIG. 5, each partial product row 220 through 236 is a multiple of the multiplicand bits 238, shown horizontally. Column numbers have been indicated on the top of FIG. 5. The multiplier bits 240 are shown vertically, and these bits are recoded to generate the multiplication factors to form the partial product rows 220 through 236. The signals n0 through n7 shown in FIG. 5 indicate sticky "1"'s which are added to partial product rows 220 through 236 which receive a negative weight. These are sufficient for dealing with multiplication which does not require a final inversion of the product. For handling the case of −(A×B) implicitly in the multiplier, an additional signal n8 is provided.

The signals s0 through s7 handle sign extension when the product of a multiply operation is subtracted implicitly within the multiplier tree. If A and B are assumed to be the multiplicand and the multiplier, respectively, a radix-4 Booth encoding proceeds by encoding groups of three bits of the multiplier operand B and using this encoding to select partial products from the set {−2A, −A, 0, A, 2A}. Now, if the final product, (A×B) needs to be subtracted, then it is equivalent to adding A×−(B). The multiplier is modified; now from B to (−B).

FIG. 6 provides a Booth recoder circuit 250 for implementing the disclosed subject matter. Booth recoder cell 250 includes multiplier group input 252 ranging from LSB input 254 at XOR 256 to MSB input 258 at inverter XOR 260. MSB input 258 also provides "neg" output from Booth recoder circuit 250. Output from XOR 256 represents the A×1 signal, A from Booth recoder 250, as well as provides input to inverter XOR 264. Output from inverter XOR 260 also provides input to inverter XOR 264 to generate the A×2 signal, 2A from Booth recoder circuit 250. XOR 264 provides an output to indicate negation, "neg" from Booth recoder circuit 250. Thus, Booth recoder circuit 250 examines 3-bits of the multiplier B and recodes them into the signals "A", "2A" and "neg". When subtraction needs to be performed, the "neg" signal is inverted to generate the partial products which will produce the two's complement of the product, A×B.

FIG. 7 provides a description of the bit grouping for the logic cell of FIG. 6 with the disclosed subject matter. In particular, radix-4 Booth recoding generates nine (9) multiplication factors from the 16-bit multiplier B, which are used as multiples of A, to generate nine (9) partial products. For "n" ranging from 0 to 8, the table of FIG. 7 determines the Booth multiplication factor for bit groups B[2n+1:2n−1]. For the recoding scheme of the present embodiment, B[−1] is assumed to be zero. B[16] and B[17] are zero if B is an unsigned number, and a sign extension of B if B is a signed number, i.e. B[17]=B[16]=B[15]. The multiplication factors are recoded into three (3) signals; A from XOR 256, 2A from inverter XOR 264 and "neg" from MSB input 262. Thus, when the multiplication factor for A is −2, the signals 2A and neg are high. Similarly, for +1, just A will be high, and all three signals will be low for +/−0. Note, also, that for generating the product A×B, the multiplication factor for the most significant bit group, B[17:15] is always positive. Now, the only possible bit groups for B[17:15] are, [000] or [001] when B is unsigned, and [000] or [111] when B is signed. From FIG. 7, all these groups lead to a positive multiplication factor. Booth multiplication multiplexers here described, therefore, may select from the set {0, A, 2A} to generate the partial products.

FIG. 8 provides a Booth recoder circuit 270 for implementing Booth recoding logic for the −(A×B) product. Booth recoder cell includes multiplier group input 272 ranging from LSB input 274 at XOR 276 to MSB input 278 at inverter XOR 280. "Subtract" input 282 and MSB input 278 flow to XOR 284. Output from XOR 276 represents the multiplicand A signal from Booth recoder 270, as well as provides input to inverter XOR 286. Output from inverter XOR 280 also provides input to inverter XOR 286 to generate the 2A signal from Booth recoder circuit 270. XOR 284 provides "neg" output from Booth recoder circuit 270.

FIG. 8, therefore, takes advantage of the property that the negative value of the product of multiplicand A and multiplier B is obtained by calculating the product of A and the negative value of B. This, therefore, avoids the known two step process of first calculating the product A×B, and then calculating the two's complement of the product to get −(A×B). Booth recoder circuit 270 performs the negation in parallel with the stage of multiplication.

The two's complementation of the product utilizes the fact that −(A×B) is equivalent to A×(−B). In this instance, the operand (−B) is treated as the multiplier. The Booth multiplication factors generated using (−B) as the multiplier are the additive inverses of the corresponding multiplication factors generated using B as the multiplier operand. The Booth multiplication hardware structure used for calculating the product A×B can be reused for calculating A×(−B) by inverting the signs of each of the Booth multiplication factors. This sign is determined by the "neg" signal of Booth recoder circuit 270, which is a modification to the recoding hardware for generating the "−neg" signal in negating the product.

Note that in Booth recoder circuit 270 XOR gate 284 is on a non-critical path, and does not contribute to the critical path. Instead, the critical path includes the multiplier bits for producing the signals A and 2A. This process of inverting the sign of the multiplication factors for partial products introduces cases in which the sign of the last partial product row may be negative. Hence, the signal "n8" may be added to the multiplication tree, as appears in FIG. 5, above. Adding a row may be reduced by modifying the reduction stage to accommodate an additional row. This, however, may infer an additional delay and associated hardware.

The process presented here does not involve an additional row in the reduction stage, but instead focuses on absorbing the n8 signal into the existing nine rows of partial products by making logical modifications to the multiplication tree. The delay added to the multiplication tree is minimal.

Notation that refers to each "dot" of the form $PP_{row\_column}$ aids in obtaining an understanding of this aspect of the disclosed subject matter. Referring to FIG. 9, each binary bit (dot) in the multiplication tree has its unique weight and position in the matrix. All bits in the same column have the same weight, and may be reduced in any order as long as the weights are maintained. The rows are numbered from top to bottom starting at 0, and the columns are numbered from right to left starting at 0. Using this notation, n8 is equivalent to $PP_{10\_16}$. $PP_{0\_16}$, $PP_{0\_17}$, $PP_{0\_18}$ and $PP_{0\_19}$ are generated using scaling and sign extension processes known with radix-4 Booth encoding. With such an approach, it is possible to absorb n8 into the multiplication tree. Thus, by analyzing all the possible bit values for $PP_{0\_16}$, $PP_{0\_17}$, $PP_{0\_18}$ and $PP_{0\_19}$ in both signed and unsigned multiplication modes, the position into which n8 may be inserted is determinable for all possible Booth multiplication factors.

FIG. 9 enumerates the range of values for the four most significant bits of partial product row 0, and the effect of adding a signal n8 to this four-bit field. A MUX structure permits selecting the modified value of the four-bit field when n8 is high. In other words, the disclosed process pre-computes the value of the four most significant bits of partial product row 0 if the signal n8 is added at column 16, i.e., $P_{0\_16}$, and uses this modified four-bit field in the reduction stage. The MUX structure is optimized such that once $PP_{0\_16}$ (shown as "a" in the table) is calculated using standard Booth multiplexing circuitry. The modified four-bit field based on n8 is resolved with a minimal delay after this. The remainder of the multiplication process is identical to the regular multiplication flow for generating the product A×B.

FIG. 10 presents a modified 16×16 radix-4 Booth Multiplication tree applicable to further aspects of the disclosed subject matter. From FIG. 10, it is possible to understand important sign extension and rounding constant functions of the present disclosure. A modification to the reduction stage of the 16×16 multiplier minimizes the critical path through nine partial product rows and provides for sign extension efficiently when the product is available in a redundant sum-carry format. FIG. 10 shows modified reduction tree 304 for a 16×16 radix-4 Booth multiplier. Modified reduction tree 304 accommodates signed and unsigned operands and has the potential to negate the product.

The first stage of reduction reduces nine (9) rows to six (6) rows using three (3) rows of full adders. The second stage of reduction reduces six (6) rows to four (4) rows using two (2) rows of full adders. The third and final stage of reduction employs a row of 4:2 multi-operand adders to reduce four (4) rows to the final redundant sum and carry rows. Though 32 bits of sum and carry are sufficient to represent the 16×16 product, an additional bit ensures sign extension is handled correctly for unsigned multiplication.

FIG. 10 further shows columns 306, which are higher than just the lower 32 bits forming the product. The present disclosure modifies the Booth multiplication tree from column #32 upward to introduce the sign bit s8 for the last partial product row 308. This sign bit s8 is not required if the product does not require sign extension. Now, to preserve the correct sign of partial product row 8, the process includes extending partial product row 308 by the one bit. Columns higher than #32 are unaffected until the last stage of reduction. At such point, the signal ~s8 resolves with the carry-out from column #31, and generates a carry-out 310 shown as "$\bar{c}$".

The final product is formed by adding the carry-out "$\bar{c}$" 310 to the one-extension from column #33 upwards. The effect is to sign-extend the sum component of the final product with $\bar{c}$ as the sign, while zero-extending the carry component of the final product. These steps eliminate the need to sign-extend both the sum and carry components. For example, if 16×16 multiplication were part of a MAC operation, which required an accumulation of a 64-bit value to the 32-bit product, then it would be required to sign-extend the 32-bit product to 64-bits before adding it to the 64-bit number. If the intermediate 32-bit product was left in the redundant form, and the sign extension process here presented is applied, significant power savings may arise because of the possibility of eliminating the MUXes used to sign-extend the carry component over 31-bits.

Referring again to FIG. 10, the present disclosure further provides the ability to add a rounding constant to the multiplier, B. A rounding constant typical to 16×16 multiplications in DSP operations is 0x8000. Rounding the product of a 16×16 multiplication is a common operation, which is typically performed as a two step operation, wherein the multiplier is first used to generate the product, and then the rounding constant is added to the product.

Using the notation explained above, note in FIG. 10 that $PP_{8\_15}$ is 0. By inserting a "1" in this bit position in the multiplication matrix, it is possible to generate the same result that would have been obtained by first generating the product and then adding to the product the value 0x8000. This process also does not add any latency to the critical path.

If the hardware in multiplication block 118 is limited to the capability of just being able to add one accumulate-operand to the product of a multiplication, then it is common to MUX the rounding constant with the accumulate-operand when the product of a multiplication is required to be rounded. This makes it difficult to perform in a single step both rounding and accumulation operations on the product of a multiplication. But, using the process here described eliminates such limitations.

In summary, the disclosed subject matter provides processes for the design and use of a digital signal processor, including processing transmissions in a communications (e.g., CDMA) system. The disclosed method and system includes a booth multiplier with enhanced reduction tree circuitry for performing Booth multiplication in a digital signal processor. The method and system determine a multiplicand, A, that includes a first plurality of bits and a multiplier, B, having a second plurality of bits. The disclosed subject matter performs radix-m, (e.g., radix-4) Booth recoding on B to generate a first predetermined integer number, "n," of multiplication factors. The "n" multiplication factors approximate one half of the number of the second plurality of bits. The method and system further generate "n" partial products using the "n" multiplication factors as multipliers of A. Then, a multiplication tree is formed using radix-m Booth encoding. In the event of a negative multiplication factor, the disclosure includes forming a two's complement of A by inverting the first plurality of bits of A and associating a sticky "1" to complete the two's complementation. Furthermore, the process involves reducing the multiplication factors in multiple stages of reduction to a set of sum and carry components of a pre-determined length.

The present disclosure further provides the technical advantages of a modified Booth multiplier that is capable of being used in MAC operations of the form [Z+−(A×B)+ rounding constant]. This multiplier minimizes delay, power, and hardware by (a) negating the booth multiplication factors and absorbing an extra sticky bit into the reduction tree, (b) finding a place to stuff a rounding constant into the reduction tree, and (c) using a sign extension process that only requires the sign extension of the redundant sum.

The processing features and functions described herein, moreover, may be implemented in various manners. For example, not only may DSP 40 perform the above-described operations, but also the present embodiments may be implemented in an application specific integrated circuit (ASIC), a microcontroller, a microprocessor, or other electronic circuits designed to perform the functions described herein. The foregoing description of the preferred embodiments, therefore, is provided to enable any person skilled in the art to make or use the claimed subject matter. Various modifications to these embodiments will be readily apparent to those skilled in the art, and the generic principles defined herein may be applied to other embodiments without the use of the innovative faculty. Thus, the claimed subject matter is not intended to be limited to the embodiments shown herein but is to be accorded the widest scope consistent with the principles and novel features disclosed herein.

What is claimed is:

1. A method for performing Booth multiplication in a digital signal processor, the method comprising:
   determining, by the digital signal processor, a multiplicand, A, comprising a first plurality of bits and a multiplier, B, comprising a second plurality of bits;
   performing, by the digital signal processor, radix-m Booth recoding on B to generate a first predetermined number, n, of multiplication factors, the n multiplication factors approximating one half of the number of the second plurality of bits;
   generating, by the digital signal processor, n partial products using the n multiplication factors as multipliers of A;
   in the event of a negative multiplication factor, forming, by the digital signal processor, a two's complement of A by inverting the first plurality of bits of A and associating a sticky "1" to complete the two's complementation; and
   reducing, by the digital signal processor, the partial products in multiple stages of reduction to a set of sum and carry components of a pre-determined length; and
   generating, based on the set of sum and carry components, by the digital signal processor, a product of A and B.

2. The method of claim 1, wherein determining a multiplicand, A, and a multiplier, B, further comprises determining A and B using a 16×16 multiplier.

3. The method of claim 1 further comprising:
   determining the negative product of A and B by setting negative B as the multiplier by determining the additive inverse of the multiplication factors; and
   generating the product as a summand of the form [Z+−(A× B)], where Z represents a value to be accumulated in the digital signal processor.

4. The method of claim 1 further comprising adding a rounding constant to the multiplication of A and B by inserting a sticky "1" into a predetermined bit of at least one of the partial products.

5. The method of claim 1 wherein:
   performing radix-m Booth recoding on B further comprises performing radix-4 Booth recoding on B to generate nine multiplication factors;
   generating n partial products further comprises generating nine partial products using the nine multiplication factors as multiples of A; and
   reducing the partial products to a set of sum and carry components of a pre-determined length further comprises reducing the partial products to a plurality of 32-bit sum and carry components.

6. The method of claim 1 further comprising performing the Booth multiplication process as a part of a 64-bit value accumulation during a MAC operation.

7. A system for operation in association with a digital signal processor for performing Booth multiplication in the digital signal processor, comprising:
   processing circuitry configured to determine a multiplicand, A, comprising a first plurality of bits and a multiplier, B, comprising a second plurality of bits;
   a multiplier block configured to perform radix-m Booth recoding on B to generate a first predetermined number, n, of multiplication factors, the n multiplication factors approximating one half of the number of the second plurality of bits;
   a plurality of multiplier units associated with the multiplier block configured to generate n partial products using the n multiplication factors as multipliers of A;
   inverter circuitry configured to form a two's complement of A, in the event of a negative multiplication factor, by inverting the first plurality of bits of A and associating a sticky "1" to complete the two's complementation; and
   reduction circuitry associated with the multiplier units configured to reduce the partial products in multiple stages of reduction to a set of sum and carry components of a pre-determined length and generate, based on the set of sum and carry components, a product of A and B.

8. The system of claim 7 wherein the processing circuitry is further configured to determine A and B using a 16×16 multiplier.

9. The system of claim 7 wherein:
   the inverter circuitry is further configured to determine the negative product of A and B by setting negative B as the multiplier by determining the additive inverse of the multiplication factors; and
   the system further comprises, accumulation circuitry configured to generate the product as a summand of the form [Z+−(A×B)], where Z represents a value to be accumulated in the digital signal processor.

10. The system of claim 7 further comprising:
    bit insertion circuitry configured to add a rounding constant to the multiplication of A and B by inserting a sticky "1" into a predetermined bit of at least one of the partial products.

11. The system of claim 7 wherein:
the multiplier block is further configured to perform radix-4 Booth recoding on B to generate nine multiplication factors;
the multiplier units are further configured to generate nine partial products using the nine multiplication factors as multiples of A;
the reduction circuitry is further configured to reduce the partial products to a plurality of 32-bit sum and carry components.

12. The system of claim 7 further comprising:
circuitry configured to perform the Booth multiplication process as a part of a 64-bit value accumulation during a MAC operation.

13. A digital signal processor for operation in support of a personal electronics device, the digital signal processor performing Booth multiplication in a digital signal processor, the digital signal processor comprising:
means for determining, by the digital signal processor, a multiplicand, A, comprising a first plurality of bits and a multiplier, B, comprising a second plurality of bits;
means for performing, by the digital signal processor, radix-m Booth recoding on B to generate a first predetermined number, n, of multiplication factors the n multiplication factors approximating one half of the number of the second plurality of bits;
means for generating, by the digital signal processor, n partial products using the n multiplication factors as multipliers of A;
means for, forming, by the digital signal processor, in the event of a negative multiplication factor, a two's complement of A by inverting the first plurality of bits of A and associating a sticky "1" to complete the two's complementation;
means for reducing, by the digital signal processor, the partial products in multiple stages of reduction to a set of sum and carry components of a pre-determined length; and
means for generating, based on the set of sum and carry components, a product of A and B.

14. The digital signal processor of claim 13 further comprising means for determining A and B using a 16×16 multiplier.

15. The digital signal processor of claim 13 further comprising:
means for determining the negative product of A and B by setting negative B as the multiplier by determining the additive inverse of the multiplication factors; and
means for generating the product as a summand of the form [Z+−(A×B)], where Z represents a value to be accumulated in the digital signal processor.

16. The digital signal processor of claim 13 further comprising means for adding a rounding constant to the multiplication of A and B by inserting a sticky "1" into a predetermined bit of at least one of the partial products.

17. The digital signal processor of claim 13 further comprising:
means for performing radix-4 Booth recoding on B to generate nine multiplication factors;
means for generating nine partial products using the nine multiplication factors as multiples of A; and
means for reducing the partial products to a plurality of 32-bit sum and carry components.

18. The digital signal processor of claim 13 further comprising means for performing the Booth multiplication process as a part of a 64-bit value accumulation during a MAC operation.

19. A computer usable medium having computer readable program code embodied therein for performing Booth multiplication in a digital signal processor, comprising:
computer readable program code for determining, by the digital signal processor, a multiplicand, A, comprising a first plurality of bits and a multiplier, B, comprising a second plurality of bits;
computer readable program code for performing, by the digital signal processor, radix-m Booth recoding on B to generate a first predetermined number, n, of multiplication factors, the n multiplication factors approximating one half of the number of the second plurality of bits;
computer readable program code for generating, by the digital signal processor, n partial products using the n multiplication factors as multipliers of A;
computer readable program code for forming, by the digital signal processor, in the event of a negative multiplication factor, a two's complement of A by inverting the first plurality of bits of A and associating a sticky "1" to complete the two's complementation;
computer readable program code for reducing, by the digital signal processor, the partial products in multiple stages of reduction to a set of sum and carry components of a pre-determined length; and
computer readable program code for generating, based on the set of sum and carry components, a product of A and B.

20. The computer usable medium of claim 19 further comprising computer readable program code for determining A and B using a 16×16 multiplier.

21. The computer usable medium of claim 19 further comprising:
computer readable program code for adding a rounding constant to the multiplication of A and B by inserting a sticky "1" into a predetermined bit of at least one of the partial products.

22. The computer usable medium of claim 19 further comprising:
computer readable program code for performing radix-4 Booth recoding on B to generate nine multiplication factors;
computer readable program code for generating nine partial products using the nine multiplication factors as multiples of A;
computer readable program code for reducing the partial products to a plurality of 32-bit sum and carry components.

23. The computer usable medium of claim 19 further comprising computer readable program code for performing the Booth multiplication process as a part of a 64-bit value accumulation during a MAC operation.

24. The computer usable medium of claim 19 further comprising:
computer readable program code for determining the negative product of A and B by setting negative B as the multiplier by determining the additive inverse of the multiplication factors; and
computer readable program code for generating the product as a summand of the form [Z+−(A×B)], where Z represents a value to be accumulated in the digital signal processor.

* * * * *

UNITED STATES PATENT AND TRADEMARK OFFICE
CERTIFICATE OF CORRECTION

| | | |
|---|---|---|
| PATENT NO. | : 7,809,783 B2 | Page 1 of 1 |
| APPLICATION NO. | : 11/355397 | |
| DATED | : October 5, 2010 | |
| INVENTOR(S) | : Krithivasan et al. | |

It is certified that error appears in the above-identified patent and that said Letters Patent is hereby corrected as shown below:

Column 13, line 24, claim 13: "factors the" to read as --factors, the--

Column 13, line 30, claim 13: "for, forming" to read as --for forming--

Signed and Sealed this
Thirtieth Day of August, 2011

David J. Kappos
*Director of the United States Patent and Trademark Office*